United States Patent
Morishima et al.

(10) Patent No.: US 7,279,244 B2
(45) Date of Patent: Oct. 9, 2007

(54) FUEL CELL, POLYELECTROLYTE AND ION-EXCHANGE RESIN USE FOR SAME

(75) Inventors: Makoto Morishima, Hitachinaka (JP); Tomoichi Kamo, Tokai (JP); Toshiyuki Kobayashi, Tokai (JP); Kenji Yamaga, Hitachi (JP); Tohru Koyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 11/176,392

(22) Filed: Jul. 8, 2005

(65) Prior Publication Data

US 2005/0271923 A1 Dec. 8, 2005

Related U.S. Application Data

(60) Division of application No. 10/176,606, filed on Jun. 24, 2002, now Pat. No. 7,022,743, which is a continuation of application No. 10/081,148, filed on Feb. 25, 2002, now Pat. No. 6,989,212.

(30) Foreign Application Priority Data

Dec. 20, 2001  (JP) .............................. 2001-388200

(51) Int. Cl.
*H01M 8/10* (2006.01)
(52) U.S. Cl. ............................ 429/33; 521/28; 521/30; 528/373; 528/374; 528/486; 528/487; 528/500; 528/503
(58) Field of Classification Search ................ 528/373, 528/374, 486, 487, 500, 503; 429/33; 521/28, 521/30
See application file for complete search history.

(56) References Cited

U.S. PATENT DOCUMENTS

| | | |
|---|---|---|
| 3,969,071 A | 7/1976 | Hugelin |
| 5,438,082 A | 8/1995 | Helmer-Metzmann et al. |
| 5,468,574 A | 11/1995 | Ehrenberg et al. |
| 5,985,477 A | 11/1999 | Iwasaki et al. |
| 6,096,856 A | 8/2000 | Helmer-Metzmann et al. |
| 6,670,065 B2 | 12/2003 | Koyama et al. |

FOREIGN PATENT DOCUMENTS

| | | |
|---|---|---|
| JP | 1-52866 | 11/1989 |
| JP | 6-93114 | 4/1994 |
| JP | 9-245818 | 9/1997 |
| JP | 10-503788 | 4/1998 |
| JP | 11-116679 | 4/1999 |
| JP | 11-510198 | 9/1999 |
| JP | 11-515040 | 12/1999 |

OTHER PUBLICATIONS

Yamamoto, "π-Conjugated Polymers Prepared by Organometallic Polycondensation", Research Laboratory of Resources Utilization, vol. 53, No. 11, Nov. 1995, pp. 77-86.
Ueda, Synthesis of Poly(2,5-dialkoxyphenylene), Macromolecules, 1992, vol. 25, pp. 5125-5130.
Mukai et al., Journal of Polymer Science: Polymer Chemistry Edition, vol. 23, 1259-63 (1985).
Canadian Office Action for Corresponding Canadian Patent Application No. 2,373,212, Mar. 21, 2006.

*Primary Examiner*—Bernard Lipman
(74) *Attorney, Agent, or Firm*—McDermott Will & Emery LLP

(57) ABSTRACT

The object of this invention is to provide a solid polymer electrolyte which is excellent in durability and of low cost, and membranes, solutions for electrode catalyst coating, membrane/electrode assemblies and fuel cells which use the electrolyte. According to this invention, there can be provided a fuel cell which comprises an electrode assembly having an electrode catalyst membrane formed therein, said catalyst membrane comprising a polymer electrolyte membrane held between an anode on one side of the principal plane of the electrolyte membrane and a cathode on the other side of the principal lane thereof, current collecting plates provided each independently in close contact, to the anode side and the cathode side of the electrode assembly, and electroconductive separators having gas supply passages to the anode and to the cathode provided on the outside surfaces of the current collecting plates.

5 Claims, 3 Drawing Sheets

FUEL CELL, POLYELECTROLYTE AND ION-EXCHANGE RESIN USE FOR SAME

RELATED APPLICATION

This application is a divisional of application Ser. No. 10/176,606 filed Jun. 24, 2002, now U.S. Pat. No. 7,022,743, which is a continuation of application Ser. No. 10/081,148, filed Feb. 25, 2002, now U.S. Pat. No. 6,989,212, which claims priority of Japanese application Serial No. 2001-388200, filed Dec. 20, 2001, and the contents of which are hereby incorporated by reference.

BACKGROUND OF THE INVENTION

This invention relates to a polymer electrolyte which is excellent in oxidation resistance, of a low cost and has a high durability suitable for electrolyte membranes used for fuel cells, electrolyitic apparatuses of water, hydrohalogenic acids and sodium chloride, oxygen enrichers, humidity sensors, gas sensors, etc., and for other like uses, and to a polymer electrolyte membrane, a polymer electrolyte membrane/electrode assembly and a fuel cell which use the polymer electrolyte.

Fluorine-containing electrolytes typically represented by perfluorohydrocarbonsulfonic acid membranes have a very high chemical stability because they have C—F bonds. Therefore, said fluorine-containing electrolytes are in use for the above-mentioned solid polymer electrolyte membranes for fuel cells and electrolytic apparatuses of water, sodium chloride and hydrohalogenic acids and, by virtue of their protonic conductivity, for humidity sensors, gas sensors, oxygen enrichers, and the like.

Said fluorine-containing electrolytes, however, are very expensive because they are produced by a special process. Furthermore, halogen compounds require sufficient consideration in the aspect of equipment to cope with environmental pollution in synthesis and discarding. Accordingly, a polymer electrolyte of a non-fluorine-containing protonic conductor which is inexpensive and environmentary-friendly is eagerly awaited.

As to inexpensive solid polymer electrolyte membranes, there have been disclosed sulfonated aromatic hydrocarbon type electrolyte membranes including sulfonated polyether ether ketone in JP-A-6-93114, sulfonated polyether sulfone in JP-A-9-245818 and JP-A-11-116679, sulfonated acrylonitrile-butadiene-styrene copolymer in JP-A-10-503788, sulfonated polysulfide in J.P. Appl. Kohyo-11-510198 and sulfonated polyphenylene in J.P. Appl. Kohyo-11-515040.

The above-mentioned sulfonated aromatic hydrocarbon type electrolyte membranes, as compared for example with fluorine-containing electrolyte membranes represented by Nafion, are easy to produce and of low cost, but are more susceptible to oxidative degradation and desulfonation.

SUMMARY OF THE INVENTION

The object of this invention is to provide a polymer electrolyte which has a degradation resistance characteristic equal to or better than that of fluorine-containing electrolytes and sufficient for practical use, can be produced at low cost and has a high durability, and polymer electrolyte membranes, polymer electrolyte membrane/electrode assemblies and fuel cells using the polymer electrolyte.

The present inventors have made extensive study on the mechanism of degradation of electrolyte membranes and resultantly found that the degradation of previous sulfonated aromatic hydrocarbon type electrolyte membranes is attributable to the fact that since the membranes are of a molecular structure wherein the sulfonic acid group is directly bonded to the aromatic ring, the sulfonic acid group is apt to be eliminated from the aromatic ring by strong acids or at high temperatures to lower the ionic conductivity. The inventors have further made extensive study to cope with the above-mentioned problem and found that polyarylenes wherein sulfonic acid groups having ion-exchanging property are bonded to aromatic rings via alkylene ether linkages are excellent for use as electrolyte membranes. This invention has been accomplished on the basis of the above findings.

The essentials of this invention are as follows.

[1] A fuel cell which comprises an electrode assembly having electrode catalyst layers formed therein, said catalyst layers comprising a polymer electrolyte membrane held between an anode on one side of the principal plane of the electrolyte membrane and a cathode on the other side of the principal plane thereof (said assembly being hereinafter referred to as polymer electrolyte membrane/electrode assembly), gas diffusion seats provided each independently, in close contact, to the anode side and the cathode side of the assembly, and electroconductive separators having gas supply passages to the anode and to the cathode provided on the outside surfaces of the gas diffusion seats, wherein the polymer electrolyte membrane comprises a polyarylene wherein sulfonic acid groups are bonded to aromatic rings via alkylene ether linkages.

[2] An ion exchange resin which comprises an arylene copolymer having at least two of the repeating structural units represented by the formulas (I), (II) and (III)

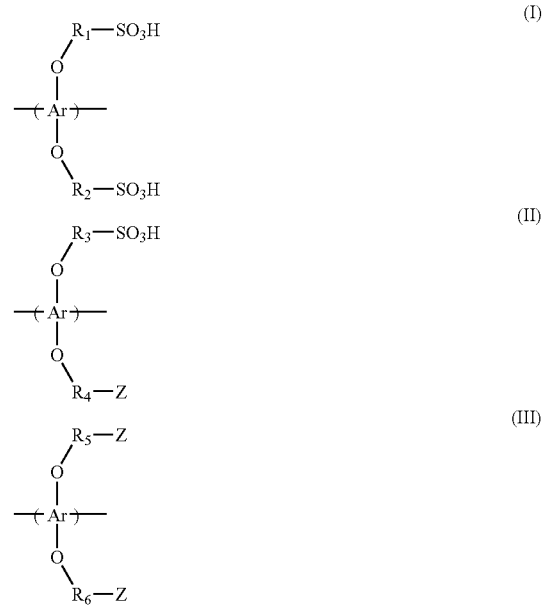

wherein Ar is at least one of the following linked structures represented by the formulas (IV), (V) and

-continued

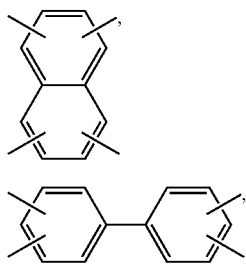

$R_1$-$R_6$ are each a group independently selected from the group of alkyl groups having 1-6 carbon atoms, and Z is hydrogen or the methyl group.

[3] The copolymer of above [2] preferably has an ion exchange group equivalent weight of 500-2,500 g/mol.

[4] A fuel cell wherein the polyarylene which is the polymer electrolyte of above [1] and wherein sulfonic acid groups are bonded to aromatic rings via alkylene ether linkages is an ion exchange resin described in above [2] or [3].

[5] The ion exchange resin of above [2] or [3] is an ion exchange resin produced by the method of oxidative coupling polymerization.

[6] A process for producing a polymer electrolyte membrane comprising a step of dissolving the ion exchange resin described in above [2] or [3] in a solvent, a step of coating the resin solution obtained in the above-mentioned step on a substrate to form a coating film, and a step of drying the coating film to remove the solvent.

[7] A polymer electrolyte composite membrane in which the ion exchange resin described in [2] or [3] is filled into the pore part of at least a past near the surface of a porous sheet and which is impermeable to gaseous fluids.

[8] A polymer electrolyte composite membrane in which the ion exchange resin described in [2] or [3] is filled completely into the whole pore region of a porous sheet and which is impermeable to fluids.

[9] A solution for electrode catalyst coating which comprises the ion exchange resin described in [2] or [3] dissolved in a solvent.

[10] An electrode paste for a fuel cell which comprises carbon particles carrying a metal catalyst dispersed in the solution for electrode catalyst coating described in [9].

[11] The electrode paste for a fuel cell described in [10] wherein the metal catalyst is platinum or its alloy.

[12] A process for producing a polymer electrolyte membrane/electrode assembly which comprises a step of coating the electrode paste for a fuel cell described in [10] or [11] on the principal plane of a polymer electrolyte membrane of polyarylene type wherein sulfonic acid groups are bonded to aromatic rings via alkylene ether linkages, followed by drying.

[13] A process for producing a polymer electrolyte membrane/electrode assembly which comprises a step of coating the electrode paste for a fuel cell described in [10] or [11] on a gas diffusion seat having electronic conductivity, followed by drying, and a step of adhereing the coated surface of the gas diffusion seats to the both sides of the principal plane of a polymer electrolyte membrane of polyarylene type wherein sulfonic acid groups are bonded to the aromatic rings via alkylene ether linkages.

[14] A portable power source comprising, in a case, a fuel cell proper and a hydrogen bomb which stores hydrogen to be supplied to the fuel cell proper, wherein the fuel cell is the one described in [1] above.

[15] A fuel cell power generating apparatus comprising a reformer which reforms a fuel gas into an anode gas containing hydrogen, a fuel cell which generates electricity from the anode gas and a cathode gas containing oxygen, and a heat exchanger which exchanges heat between a high temperature anode gas which has come out from the reformer and a lower temperature fuel gas supplied to the reformer, wherein the fuel cell is the one described in [1].

Other objects, features and advantages of the invention will become apparent from the following description of the embodiments of the invention taken in conjunction with the accompanying drawings.

DESCRIPTION OF REFERENCE NUMERALS

Figure 1:
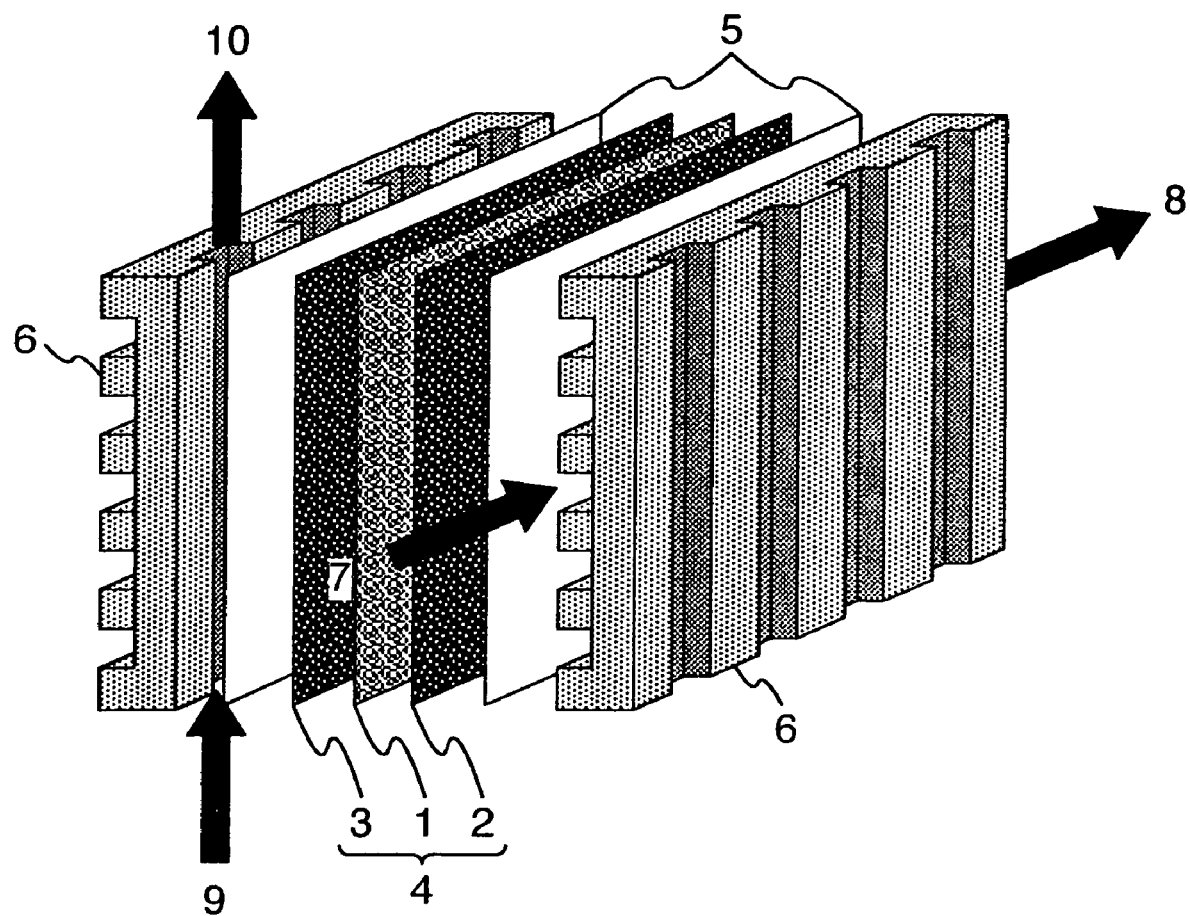
FIG. 1 shows the structure of a single cell for a polymer electrolyte fuel cell according to this invention.

1—polymer electrolyte membrane, 2—air electrode, 3—oxygen electrode, 4—polymer electrolyte membrane/electrode assembly, 5—gas diffusion layer, 6—separator, 7—humidified oxygen, 8—residual oxygen, 9—humidified hydrogen, 10—residual hydrogen.

DETAILED DESCRIPTION OF THE INVENTION

The polymer electrolyte according to this invention is an ion exchange resin which contains an arylene copolymer having at least two of the repeating structural units represented by the above-mentioned structural formulas (I), (II) and (III). The Ar in the above formulas which represented the arylene copolymer is any one of the above-mentioned tetravalent aromatic groups (IV), (V) and (VI). The molecular structure of the above-mentioned arylene copolymer is formed of skeletons of phenylene, naphthalene and/or biphenylene and hence exerts a great effect in imparting acid resistance and heat resistance.

The synthesis of the arylene copolymer is not particularly limited as to its method. There may be used, for example, a process which synthesizes a polyarylene, e.g., polyphenylene and polynaphthalene, from diboronic acids and aromatic dihalide compounds by using a platinum-containing catalyst disclosed in J. Synth. Org. Chem. Jpn., 1995, Vol. 53, 999).

The ion exchange group equivalent weight of the polyarylene wherein sulfonic acid groups are bonded to aromatic rings via alkylene ether linkages which is the polymer electrolyte of this invention is preferably 500-2,500 g/mol, more preferably 550-1,500 g/mol. When the ion exchange group equivalent weight exceeds 2,500 g/mol, the output performance of the fuel cell becomes poor in some cases, whereas when it is less than 500 g/mol, the water resistance of the polyarylene (copolymer) tends to be poor.

The ion exchange group equivalent weight mentioned above represents the molecular weight of the polyarylene (copolymer) per unit mol of the sulfonic acid groups introduced into the copolymer, and indicates the amount of sulfonic acid groups introduced into the polyarylene (copolymer). The smaller the value, the higher the degree of sulfoalkylation. The ion exchange group equivalent weigh can be determined by 1H-NMR spectroscopy, elemental analysis, acid-base titration (e.g., the method described in JP-B-1-52866), and nonaqueous acid-base titration (using a benzene-methanol solution of potassium methoxide as the normal solution).

In this invention, for controlling the ion exchange group equivalent weight of the polymer electrolyte to the range of 500-2,500 g/mol, it is preferable to synthesize the polymer electrolyte by the method of oxidative coupling polymerization, the proportion of the structural units (I), (II) and (III) being appropriately regulated. This method of synthesis is inexpensive, simple can easy.

The ion exchange resin of this invention is used, in a fuel cell, in the form of polyarylene (copolymer) membrane having sulfonic acid groups. The polyarylene (copolymer) membrane may be produced by the method of, for example, solution casting, which forms the membrane from a solution, melt pressing and melt extrusion. Preferred among them is the solution casting method, wherein, for example, a polymer solution is coated by casting on a substrate and then the solvent is removed to form the membrane.

The solvent used in membrane-forming is not particularly limited so long as it can be removed after dissolving polyarylene (copolymer). There may be used, for example, aprotic polar solvents, such as N,N-dimethylformamide, N,N-dimethylacetamide, N-methyl-2-pyrrolidone and dimethyl sulfoxide; alkylene glycol monoalkyl ethers, such as ethylene glycol monomethyl ether, ethylene glycol monoethyl ether, propylene glycol monomethyl ether and propylene glycol monoethyl ether; alcohols, such as isopropyl alcohol and t-butyl alcohol, and tetrahydrofuran.

As the reinforcement for the membrane, there may be used porous membranes, nonwoven fabric, fibrils and fillers within limits not deleterious to the effect of this invention.

The thickness of the polymer electrolyte membrane of this invention is preferably 5-200 μm, more preferably 10-100 μm. When the thickness is less than 5 μm, it is difficult to obtain a membrane strength which can fit for practical use, whereas when it exceeds 200 μm, it is difficult to attain the decrease of membrane resistance, in other words, the improvement of power generating characteristic. When the membrane is formed by the solution casting method, the thickness of the membrane can be controlled by regulating the concentration of the solution used or the amount of the solution coated on the substrate.

In producing the electrolyte of this invention, additives used for common polymers, e.g., crosslinking agents, plasticizers, stabilizers and releasing agents, may be used within limits not deleterious to the effect of this invention.

The polymer electrolyte membrane/electrode assembly for the fuel cell of this invention is preferably produced by a process which comprises a step of coating an electrode paste on the both sides of a polymer electrolyte membrane of polyarylene type wherein sulfonic acid groups are bonded to aromatic rings via alkylene ether linkages, followed by drying, or a process which comprises a step of coating an electrode paste on a gas diffusion seat having electronic conductivity, followed by drying, and a step of adhereing the coated surface of the diffusion seat to the both sides of the principal plane of the polymer electrolyte membrane of polyarylene type wherein sulfonic acid groups are bonded to aromatic rings via alkylene ether linkages.

The gas diffusion electrode used in the polymer electrolyte membrane/electrode assembly for fuel cells may contain water repellents and bonding agents according to necessity.

The catalyst metal is not particularly limited so long as it is a metal capable of promoting the oxidation of hydrogen and the reduction of oxygen and may be, for example, platinum, gold, silver, palladium, iridium, rhodium, ruthenium, iron, cobalt, nickel, chromium, tungsten, manganese, vanadium or the alloys thereof. Particularly preferred among them are platinum and its alloys, being excellent in the effect of promoting the oxidation of hydrogen and the reduction of oxygen.

The catalyst metal preferably has a particle diameter of 10-300 Å. The catalyst metal is preferably supported in dispersion on a carrier, such as carbon, whereby the amount of the catalyst used can be decreased to bring advantage in cost. The amount of the catalyst metal to be supported is preferably 0.01-10 mg/cm$^2$ when the polymer electrolyte membrane/electrode assembly (gas diffusion electrode) is in the fabricated state.

The conducting material used for supporting fine particles of catalyst metal is not particularly limited so long as it is an electronic conductive material and may be, for example, various metals, carbonaceous materials, and electroconductive polymers. Particularly preferred of these are carbonaceous materials because they are excellent in the effect of imparting electroconductivity and mechanical strength.

The carbonaceous materials may be, for example, carbon black, such as furness black, channel black and acetylene black, active carbon and graphite. They may be used each alone or as a mixture thereof.

As to the above-mentioned bonding agents, the use of the solution for electrode catalyst coating of this invention is preferred because of its good surface adhesiveness-imparting ability, but various known binder resins may also be used. For example, fluorine-containing resins which are water repellent and particularly excellent in heat resistance and oxidation resistance, e.g., polytetrafluoroethylene, tetrafluoroethylene-perfluoroalkyl vinyl ether copolymer and tetrafluoroethylene-hexafluoropropylene copolymer, are more preferable. The water repellents used may be, for example, fluorinated hydrocarbons.

The method used for assembling an electrolyte membrane and an electrode for fuel cells may be known ones. For example, there are known a method which comprises mixing carbon carrying platinum catalyst powder with a polytetrafluoroethylene liquid suspension, coating the mixture on carbon paper, followed by heat treatment, to form a catalyst layer, then coating a solution of the same electrolyte as that of the electrolyte membrane on the catalyst layer obtained above, and uniting the resulting layer with the above-mentioned electrolyte membrane by hot pressing to form an integral body; further, a method of preliminarily coating an electrolyte solution on platinum catalyst powder, a method of coating a catalyst paste on the electrolyte membrane, a method of electroless-plating an electrode on the electrolyte membrane, and a method of making a metal complex ion of the platinum group adsorbed onto the electrolyte membrane, followed by reduction.

In this invention, it is preferable for example that a polymer (including copolymer) electrolyte solution (electrode catalyst coating solution) is added to electrode catalyst-carrying carbon, the resulting mixture is dispersed uniformly to prepare a catalyst paste, and then the catalyst paste is coated on the both sides of the polymer electrolyte for a fuel cell and dried. Further, the electrode catalyst is preferably a metal of the platinum group or its alloy.

In this invention, fuel cells of various forms can be provided by using the above-mentioned ion exchange resin for the electrolyte membrane. For example, a polymer electrolyte fuel cell single cell can be formed which comprises the above-mentioned polymer electrolyte membrane/electrode assembly held between an oxygen electrode on one side of the principal plane of the electrolyte membrane and a hydrogen electrode on the other side thereof, gas diffusion seats provided each independently to the oxygen electrode side and the hydrogen electrode side in close contact, and electroconductive separators having gas supply passages to the oxygen electrode and to the hydrogen electrode provided on the outside surfaces of the gas diffusion seats.

Moreover, a portable power source can be provided which has, in a case, the above-mentioned fuel cell proper and a hydrogen bomb that stores hydrogen to be supplied to the fuel cell.

Furthermore, a fuel cell power generating apparatus can be provided which is provided with a reformer that reforms a fuel gas into an anode gas containing hydrogen, a fuel cell that generates electricity from the anode gas and a cathode gas containing oxygen, and a heat exchanger that exchanges heat between high temperature anode gas that has come out from the reformer and a low temperature fuel gas supplied to the reformer.

DESCRIPTION OF PREFERRED EMBODIMENT

This invention is described in detail below with reference to Examples. The characteristic properties described in this invention were determined by the following methods.

(1) Ion Exchange Group Equivalent Weight

A sulfoalkylated polymer of the object of determination which had been made into the acid type with an aqueous $1N-H_2SO_4$ solution was weighed accurately (a g) into a closed-type glass vessel, an excess of aqueous calium chloride solution was added thereto and the resulting mixture was stirred for 10 hours. The hydrogen chloride evolved in the reaction system was titrated (b ml) with a standard 0.1N aqueous sodium hydroxide solution (potency, f) using phenolphthalein as the indicator. The ion exchange group equivalent weight was calculated from the following equation.

Ion exchange group equivalent weight=$(1,000 \times a)/(0.1 \times b \times f)$ (2) Output Performance Valuation of Fuel Cell Single Cell An electrolyte having an electrode assembled therewith was built into an evaluation cell to evaluate the output performance of a fuel cell. Hydrogen and oxygen were used as the reaction gases, which were both, at a pressure of 1 atmosphere, humidified by passing through a water bubbler, and then supplied to the evaluation cell. The gas flow rates were 60 ml/min for hydrogen and 40 ml/min for oxygen and the cell temperature was 70° C. The cell output performance was evaluated with an H201B charge and discharge apparatus (mfd. y Hokuto Denko K.K.).

EXAMPLE 1

(1) Preparation of 1,4-di(sulfobutoxy)benzene sodium

An ethanol solution of sodium hydroxide was added by drops with stirring to an ethanol solution of hydroquinone. Butanesultone was added by drops to the resulting reaction solution and, after completion of the dropwise addition, the mixture was allowed to react by heating, at 80° C. for 3 hours. The reaction solution obtained above was cooled, then the resulting deposit was collected by filtration and recrystallized from water to obtain a milky white needle crystal product.

The product obtained was determined for its $^1$H-NMR and infrared absorption (Ir) spectrum and resultantly was confirmed to be 1,4-di(sulfobutoxy)-benzene sodium.

IR (hv): 3025, 2945, 2875, 1600, 1055
$^1$H-NMR δ(ppm): 0.92, 1.42, 1.65, 3.87, 6.81

(2) Preparation of 1-methoxy-4-sulfopropoxybenzene sodium

In the same manner as in above (1), the objective compound was synthesized from 4-methoxyphenol and butanesultone. The crude product was recrystallized from water to obtain a milky white needle crystal product. The resulting product was determined for its $^1$H-NMR and IR spectrum to confirm that it was 1-methoxy-4-sulfobutoxybenzene sodium.

IR (hv): 3030, 2940, 2880, 1600, 1250, 1055
$^1$H-NMR δ(ppm): 0.92, 1.42, 1.65, 3.80, 3.87, 6.81

(3) Preparation of 1,4-di(butoxy)benzene

The objective compound was synthesized from hydroquinone and 1-bromobutane according to the method described in Macromolecules, 1992, vol. 25, 5125. The product obtained was determined for its $^1$H-NMR and IR spectrum and resultantly was confirmed to be 1,4-di(butoxy)benzene.

IR (hv): 3030, 2940, 2880, 1600, 1250, 1055
$^1$H-NMR δ(ppm): 0.96, 1.49, 1.73, 3.90, 6.82

(4) Preparation of Polyphenylene Copolymer

The above-mentioned 1,4-di(sulfobutoxy)-benzene sodium, 1-methoxy-4-sulfobutoxybenzene sodium and 1,4-di(butoxy)benzene were compounded in a proportion of 20:10:70 and polymerized in nitrobenzene with anhydrous ferric chloride as the oxidizing agent (according to the method described in Macromolecules, 1992, vol. 25, 5125). The resulting reaction solution was poured into 5% hydrochloric acid-methanol, and the deposited precipitate was collected by filtration. The precipitate was repeatedly subjected to deionized water washing using a mixer and recovery operation by suction filtration until the filtrate became neutral, and then dried under reduced pressure at 120° C. for 10 hours to obtain a polymer. The ion exchange group equivalent weight of the polymer was 680 g/mol. Further, it was confirmed by $^1$H-NMR that the polymer obtained had just the same ratio of the repeating structural units represented by the formulas (I), (II) and (III) of this invention of 20:10:70 as that of the fed materials.

$^1$H-NMR δ(ppm): 0.9, 1.4, 1.7, 3.8, 3.9, 6.8

The weight average molecular weight of the polymer obtained (value determined by GPC and calculated in terms of polystyrene) was 32,000. The conditions of GPC determination were as follows.

GPC apparatus: HLC-8220 GPC, mfd. by Toso K.K.
Column: TSK gel Super AWM-H x 2, mfd. by Toso K.K.
Eluate: NMP (10 ml/l lithium bromide addition)

(5) Preparation of Electrolyte Membrane

The polyphenylene copolymer obtained in (4) above was dissolved in N,N-dimethylformamide to form a 20% by weight solution. The solution was coated by casting on a glass substrate, then dried at 80° C. under reduced pressure for 1 hour and then at 150° C. for 3 hours to remove the solvent, to prepare an electrolyte membrane (I). The electrolyte membrane (I) obtained had a thickness of 32 µm and an ionic conductivity of 0.027 s/cm.

Figure 2:
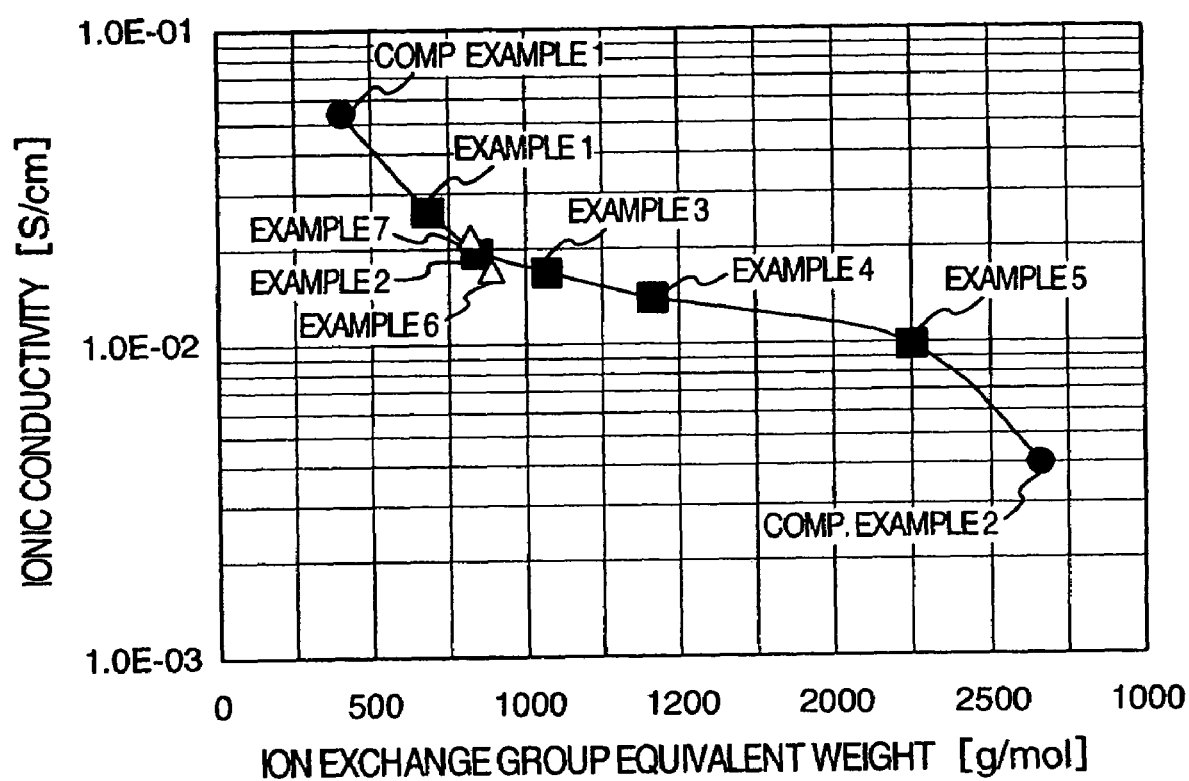
FIG. 2 shows a relation between the ion exchange group equivalent weight of a polymer electrolyte membrane according to this invention and the ionic conductivity thereof.

FIG. 2 shows a relation between the ion exchange equivalent weight of the electrolyte membrane prepared above and the ionic conductivity thereof.

The electrolyte membrane (I) and 20 ml of deionized water were placed in an inner surface teflon-coated closed vessel made of SUS, and held at 120° C. for 2 weeks. As the result, the ionic conductivity of the electrolyte membrane (I) after being held for 2 weeks showed almost no change from the initial value and the condition of the membrane was also normal.

(6) Preparation of Electrode Paste and Membrane/Electrode Assembly

The polyphenylene copolymer obtained in (4) above was dissolved in a solvent mixture of isopropanol/water (80:20) to form a 5% by weight solution. The solution was added to a carbon carrying 40% by weight of platinum so that the weight ratio of the platinum catalyst to the polymer electrolyte might be 2:1, and the resulting mixture was uniformly dispersed to prepare an electrode paste (I). The electrode paste (I) was coated on the both sides of the electrolyte membrane (I) obtained in (5) above and then dried to obtain a membrane/electrode assembly (I) carrying 0.25 mg/cm$^2$ of platinum.

(7) Durability Test of Fuel Cell Single Cell

The membrane/electrode assembly (I) was made to absorb water by immersing it in boiling deionized water for 2 hours. The membrane/electrode assembly obtained was built into a polymer electrolyte fuel cell single cell shown in FIG. 1 to evaluate the output performance of the fuel cell.

The polymer electrolyte fuel cell single cell shown in FIG. 1 is of a structure comprising the membrane/electrode assembly 4 of Example 1 composed of an electrode membrane 1, oxygen electrode 2 and hydrogen electrode 3, gas diffusion electrodes 5 of thin carbon paper provided in close contact onto the both electrodes of the assembly 4, and electroconductive separators 6 having double roles of electrode chamber separation and the gas supply passage to the electrode provided from the both sides of the gas difusion electrodes 5.

Figure 3:
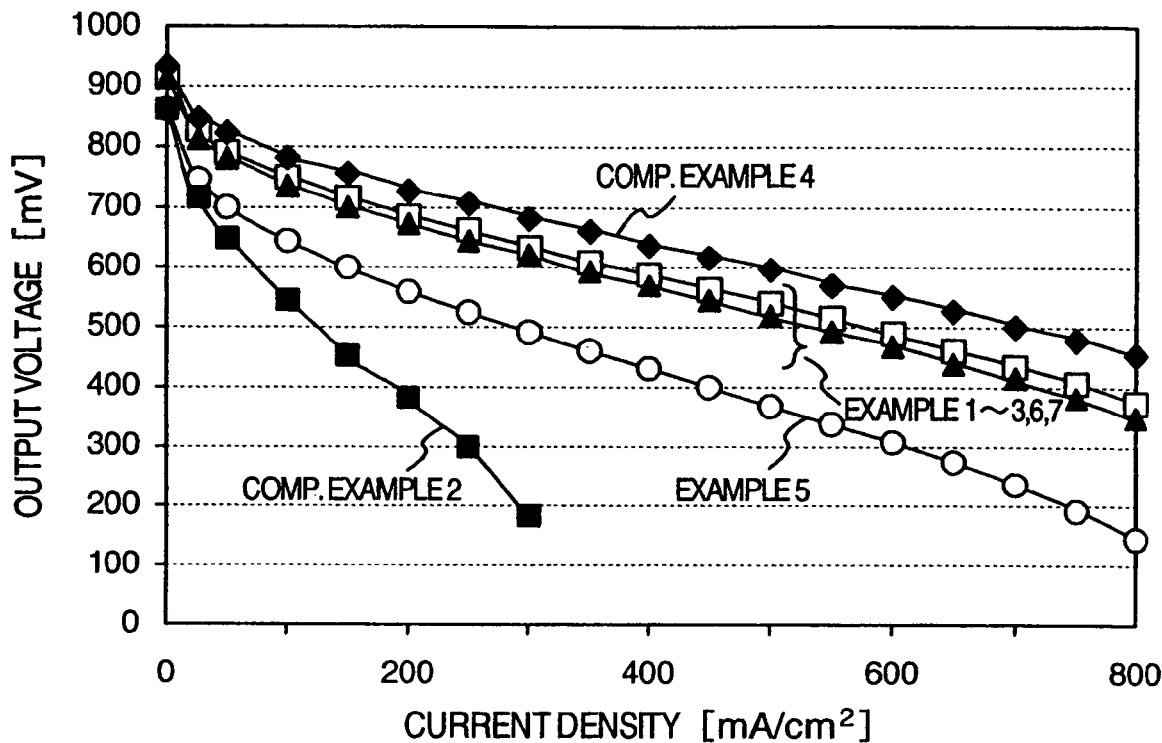
FIG. 3 shows the result of the output performance evaluation of a unit cell for a polymer electrolyte fuel cell according to this invention.

FIG. 3 shows the results of evaluation of output performance of fuel cells.

Figure 4:
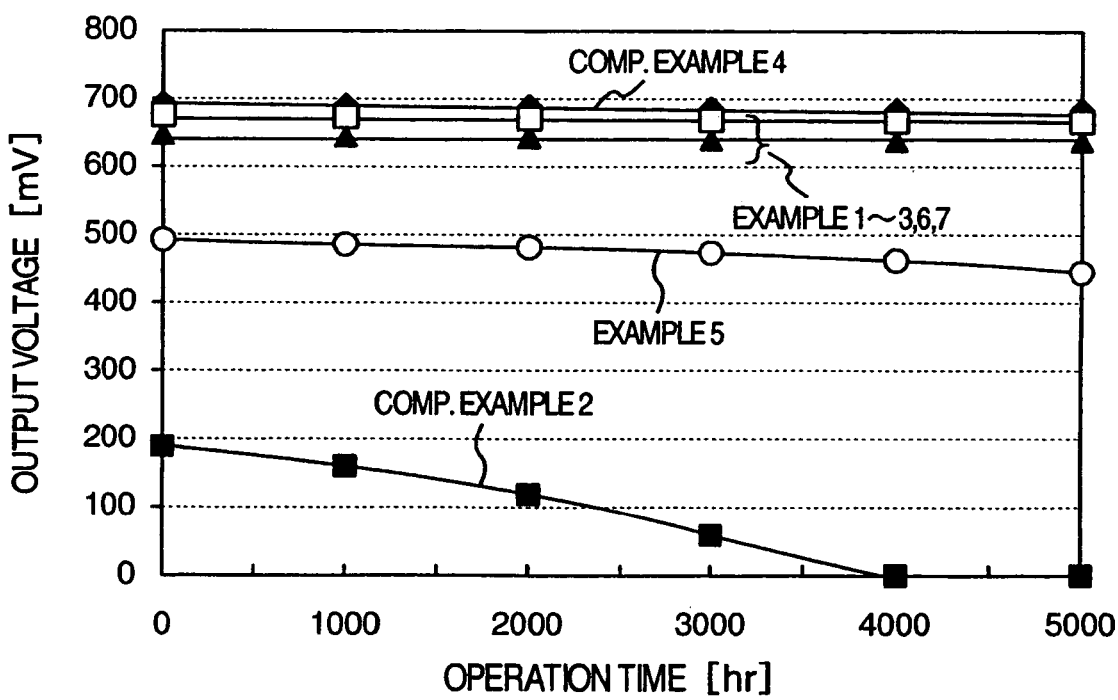
FIG. 4 shows the result of the durability test of a unit cell for a polymer electrolyte fuel cell according to this invention.

FIG. 4 shows the result of long time operation test of the above-mentioned polymer electrolyte fuel cell single cell conducted at a current density of 300 mA/cm$^2$.

The ion exchange resin comprising a copolymer which contains at least two of the repeating structural units represented by the structural formulas (I), (II) and (III) is excellent in durability as acid resistance and high-temperature resistance and makes it possible to reduce cost. Accordingly, by using the ion exchange resin, polymer electrolytes, solid polymer electrolyte membranes, polymer electrolyte membrane/electrode assemblies and fuel cells which have high performance characteristics and high reliability can be provided. Further, the ion exchange resin of this invention can be applied to electrolyte membranes used in electrolysis of hydrohalogenic acids and sodium chloride, and in oxygen enrichers, humidity sensors, gas sensors, etc.

EXAMPLE 2

(1) Preparation of Polyphenylene Copolymer 1,4-Di(sulfobutoxy)benzene sodium, 1-methoxy-4-sulfobutoxybenzene sodium and 1,4-di(butoxy)benzene were compounded in a proportion of 15:10:75, and a polyphenylene copolymer was prepared by the same method as in Example 1 (4).

The ion exchange group equivalent weight of the polymer obtained was 830 g/mol.

It was confirmed by $^1$H-NMR that the copolymer obtained had just the same ratio of the repeating structural units represented by the formulas (I), (II) and (III) of this invention of 15:10:75 as that of the fed materials.

$^1$H-NMR δ(ppm): 0.9, 1.4, 1.7, 3.8, 3.9, 6.8

The weight average molecular weight of the polymer (determined by GPC and calculated in terms of polystyrene) was 33,000.

(2) Preparation of Electrolyte Membrane

The polyphenylene copolymer obtained in (1) above was used to prepare an electrode membrane (II) according to the same method as described in Example 1 (5). The electrolyte membrane (II) had a thickness of 30 µm and an ionic conductivity of 0.020 s/cm.

FIG. 2 shows a relation between the ion exchange group equivalent weight of the electrode membrane (II) thus prepared and the ionic conductivity thereof.

The electrolyte membrane (II) and 20 ml of deionized water were placed in an inner surface teflon-coated SUS closed vessel and held at 120° C. for 2 weeks. As the result, the ionic conductivity of the electrolyte membrane (II) showed almost no change from the initial value, and the condition of the membrane was also normal.

(3) Preparation of Electrode Paste and Membrane/Electrode Assembly

The polyphenylene copolymer of above (1) was used to prepare an electrode paste (II) according to the same method as described in Example 1 (6). The electrode paste (II) was coated on the both sides of the electrolyte membrane (II) obtained in (2) above, and then dried to prepare a membrane/electrode assembly (II) carrying 0.25 mg/cm$^2$ of platinum.

(4) Durability Test of Fuel Cell Single Cell

The membrane/electrode assembly (II) was made to absorb water by immersing it in boiling deionized water for 2 hours. The membrane/electrode assembly thus obtained was built into an evaluation cell, and the output performance of the fuel cell was evaluated. The result obtained is shown in FIG. 3.

The above-mentioned polymer electrolyte fuel cell single cell was subjected to a long time operation test at a current density of 300 mA/cm$^2$. The result thus obtained is shown in FIG. 4.

EXAMPLE 3

(1) Preparation of Polyphenylene Copolymer 1,4-Di(sulfobutoxy)benzene sodium, 1-methoxy-4-sulfobutoxybenzene sodium and 1,4-di(butoxy)benzene were compounded in the same manner as in Example 1 (4) but in a proportion of 10:10:80, and a polyphenylene polymer was prepared according to the same method as in Example 1 (4). The ion exchange group equivalent weight of the polymer thus obtained was 1,060 g/mol.

It was confirmed by $^1$H-NMR that the copolymer obtained had just the same ratio of the repeating structural units represented by the formulas (I), (II) and (III) of this invention of 10:10:80 as that of the fed materials.

$^1$H-NMR δ(ppm): 0.9, 1.4, 1.7, 3.8, 3.9, 6.8

The weight average molecular weight of the polymer (determined by GPC and calculated in terms of polystyrene) was 31,000.

(2) Preparation of Electrolyte Membrane

The copolymer obtained in (1) above was used to prepare an electrolyte membrane (III) according to the same method as in Example 1 (5). The electrolyte membrane (III) had a thickness of 31 μm and an ionic conductivity of 0.017 s/cm.

FIG. 2 shows a relation between the ion exchange group equivalent weight of the electrolyte membrane (III) prepared above and the ionic conductivity thereof.

The above-mentioned electrolyte membrane (III) and 20 ml of deionized water were placed in an inner surface teflon-coated SUS closed vessel and held at 120° C. for 2 weeks. As the result, the ionic conductivity of the electrolyte membrane (III) showed almost no change from the initial value, and the condition of the membrane was also normal.

(3) Preparation of Electrode Paste and Membrane/Electrode Assembly

The copolymer obtained in (1) above was used to prepare an electrode paste (III) according to the same method as described in Example 1 (6). The electrode paste (III) was coated on the both sides of the electrode membrane (III) obtained in (2) above, and then dried to obtain a membrane/electrode assembly (III) carrying 0.25 mg/cm$^2$ of platinum.

(4) Durability Test of Fuel Cell Single Cell

The membrane/electrode assembly (III) was made to absorb water by immersing it in boiling deionized water for 2 hours. The membrane/electrode assembly thus obtained was built into an evaluation cell, and the output performance of the fuel cell was evaluated. The result are shown in FIG. 3. The above-mentioned polymer electrolyte fuel cell single cell was subjected to a long time operation test at a current density of 300 MA/cm$^2$. The result obtained is shown in FIG. 4.

EXAMPLE 4

(1) Preparation of Polyphenylene Copolymer 1,4-Di(sulfobutoxy)benzene sodium, 1-methoxy-4-sulfobutoxybenzene sodium and 1,4-di(butoxy)benzene were compounded in a proportion of 10:5:85 in the same manner as in Example 1 (4), and a polyphenylene copolymer was prepared according to the same method as in Example 1 (4).

The polymer had an ion exchange group equivalent weight of 1,410 g/mol.

It was confirmed by $^1$H-NMR that the copolymer obtained had just the same ratio of the repeating structural units represented by the formulas (I), (II) and (III) of this invention of 10:5:85 as that of the fed materials.

$^1$H-NMR δ(ppm): 0.9, 1.4, 1.7, 3.8, 3.9, 6.8

The polymer had a weight average molecular weight (determined by GPC and calculated in terms of polystyrene) of 34,000.

(2) Preparation of Electrolyte Membrane

The copolymer obtained in (1) above was used to prepare an electrolyte membrane (IV) according to the same method as in Example 1 (5). The electrode membrane (IV) had a thickness of 30 μm and an ionic conductivity of 0.014 s/c.

FIG. 2 shows a relation between the ion exchange group equivalent weight of the electrolyte membrane (IV) prepared above and the ionic conductivity thereof.

The electrolyte membrane (IV) and 20 ml of deionized water were placed in an inner surface teflon-coated SUS closed vessel and held at 120° C. for 2 weeks. As the result, the ionic conductivity of the electrolyte membrane (IV) showed no change from the initial value, and the condition of the membrane was also normal.

(3) Preparation of Electrode Paste and Membrane/Electrode Assembly

The polyphenylene copolymer obtained in (1) above was used to prepare an electrode paste (IV) according to the same method as described in Example 1 (6).

The electrode paste (IV) was coated on the both sides of the electrolyte membrane (IV) obtained in (2) above, and then dried to obtain a membrane/electrode assembly (IV) carrying 0.25 mg/cm$^3$ of platinum.

(4) Durability Test of Fuel Cell Single Cell

The membrane/electrode assembly (IV) was made to absorb water by immersing it in boiling deionized water for 2 hours. The membrane/electrode assembly thus obtained was built into an evaluation cell to evaluate the output performance of fuel cell. The result of evaluation is shown in FIG. 3. The above-mentioned polymer electrolyte fuel cell single cell was subjected to a long time operation test at a current density of 300 mA/cm$^2$. The result obtained is shown in FIG. 4.

EXAMPLE 5

(1) Preparation of Polyphenylene Copolymer 1,4-Di(sulfopropoxy)benzene sodium, 1-methoxy-4-sulfopropoxybenzene sodium and 1,4-di(butoxy)benzene were compounded in the same manner as in Example 1 (4) but in a proportion of 0:10:90, and a polyphenylene copolymer was prepared according to the same method as in Example 1 (4). The polymer had an ion exchange group equivalent weight of 2,230 g/mol.

It was confirmed by $^1$H-NMR that the copolymer obtained had just the same ratio of the repeating structural units represented by the formulas (I), (II) and (III) of this invention of 0:10:90 as that of the fed materials.

$^1$H-NMR δ(ppm): 0.9, 1.4, 1.7, 3.8, 3.9, 6.8

The polymer had a weight average molecular weight (determined by GPC and calculated in terms of polystyrene) of 32,000.

(2) Preparation of Electrolyte Membrane

The copolymer obtained in (1) above was used to prepare an electrolyte membrane (V) according to the same method as in Example 1 (5). The electrolyte membrane (V) obtained had a thickness of 30 μm and an ionic conductivity of 0.010 s/cm.

FIG. 2 shows a relation between the ion exchange group equivalent weight of the electrolyte membrane (V) thus prepared and the ionic conductivity thereof.

The electrolyte membrane (V) and 20 ml of deionized water were placed in an inner surface teflon-coated SUS closed vessel and held at 120° C. for 2 weeks. As the result, the ionic conductivity of the electrolyte membrane (V) showed almost no change from the initial value, and the condition of the membrane was also normal.

(3) Preparation of Electrode Paste and Membrane/Electrode Assembly

The copolymer obtained in (1) above was used to prepare an electrode paste (V) according to the same method as described in Example 1 (6). The electrode paste (V) obtained was coated on the both sides of the electrolyte membrane (V) obtained in (2) above and then dried to prepare a membrane/electrode assembly (V) carrying 0.25 mg/cm$^2$ of platinum.

(4) Durability Test of Fuel Cell Single Cell

The membrane/electrode assembly (V) was made to absorb water by immersing it in boiling deionized water for 2 hours. The membrane/electrode assembly thus obtained was built into an evaluation cell to evaluate the output performance of fuel cell. The result of evaluation is shown in FIG. 3. The above-mentioned polymer electrolyte fuel cell single cell was subjected to a long time operation test at a current density of 300 mA/cm$^2$. The result obtained is shown in FIG. 4.

EXAMPLE 6

(1) Preparation of poly(2,6-dihydroxy-1,5-naphthylene)

In preliminarily deaerated ethyl acetate used as the reaction solvent, 2.01 equivalents of benzylamine was added to 1 equivalent of 2,6-dihydroxynaphthalene, and the reaction mixture was heated under reflux in a nitrogen stream for 2 hours. The resulting reaction solution was cooled and allowed to stand, whereby crystals of 2,6-dihydroxynaphthalene-benzylamine salt was deposited. The crystals were collected by filtration and dried overnight at room temperature under reduced pressure. From the result of $^1$H-NMR determination of the product thus obtained, it was confirmed that poly(2,6-dihydroxy-1,5-nephthylene) had been selectively obtained.

To 1 equivalent of the 2,6-dihydroxynaphthalene-benzylamine salt mentioned above was added 3 equivalents of iron chloride hexahydrate, the resulting mixture was stirred in an agate mortar in dry nitrogen, and allowed to stand at room temperature for 24 hours. The reaction product thus obtained was put into methanol containing 5% hydrochloric acid, then stirred, the precipitate was collected by filtration, and the precipitate was subjected repeatedly to deionized water washing using a mixer and recovery operation by suction filtration until the filtrate became neutral, and then dried overnight at 120° C. under reduced pressure. The polymer thus obtained had a weight average molecular weight (determined by GPC and calculated in terms of polystyrene) of 26,000.

(2) Sulfobutoxylation of poly(2,6-dihydroxy-1,5-naphthylene)

In N,N-dimethylformamide used as the solvent, poly(2,6-dihydroxy-1,5-naphthylene), 1-bromobutane butanesultone and sodium hydroxide were made to react in a proportion of 60 mmol: 100 mmol: 20 mmol: 125 mmol. The reaction mixture was stirred at 80° C. for 6 hours to effect sulfobutylation of the poly(2,6-dihydroxy-1,5-naphthylene). The resulting reaction solution was put slowly into deionized water to deposit polymer, and the deposit was collected by filtration. Then the deposit was acid-treated by addition of 1N aqueous hydrochloric acid solution, then collected by filtration, and subjected repeatedly to deionized water washing using a mixer and recovery operation by suction filtration until the filtrate became neutral, and dried overnight at 120° C. under reduced pressure. From the result of $^1$H-NMR determination it was confirmed that sulfobutoxylation of poly(2,6-dihydroxy-1,5-naphthylene) had been achieved selectively and quantitatively. The polymer had an ion exchange group equivalent weight of 890 g/mol.

(3) Preparation of Electrolyte Membrane

The product obtained in (2) above was used to prepare an electrolyte membrane (VI) according to the same method as in Example 1 (5). The electrolyte membrane (VI) obtained had a thickness of 32 μm and an ionic conductivity of 0.017 s/cm.

FIG. 2 shows a relation between the ion exchange group equivalent weight of the electrolyte membrane (VI) prepared above and the ionic conductivity thereof.

The electrolyte membrane (VI) and 20 ml of deionized water were placed in an inner surface teflon-coated SUS closed vessel and held at 120° C. for 2 weeks. As the result, the ionic conductivity of the electrolyte membrane (VI) showed almost no change from the initial value, and the condition of the membrane was also normal.

(4) Preparation of Electrode Paste and Membrane/Electrode Assembly

The polymer obtained in (2) above was dissolved in a solvent mixture of isopropanol/water (80:20) to form a 5% by weight solution. The solution was added to a carbon carrying 40% by weight platinum so that the weight ratio of the platinum catalyst to the polymer electrolyte might be 2:1, and the resulting mixture was dispersed uniformly to prepare an electrode paste (VI). The electrode paste (VI) was coated on the both sides of the electrolyte membrane (VI) obtained in (3) above, and then dried to prepare a membrane/electrode assembly (VI) carrying 0.25 mg/cm$^2$ of platinum.

(5) Durability Test of Fuel Cell Single Cell

The membrane/electrode assembly (VI) was made to absorb water by immersing it in boiling deionized water for 24 hours. The membrane/electrode assembly thus obtained was built into an evaluation cell to evaluate the output performance of fuel cell. The result of evaluation is shown in FIG. 3. The polymer electrolyte fuel cell single cell was subjected to a long time operation test at a current density of 300 mA/cm$^2$. The result obtained is shown in FIG. 4.

EXAMPLE 7

(1) Preparation of 4,4'-disulfobutoxybiphenyl sodium

In the same manner as in Example 1 (1), the objective compound was prepared by using ethanol as the reaction solvent and by reacting 4,4'-dihydroxybiphenyl, butanesultone and sodium hydroxide in a proportion of 1:2.1:2.2. The reaction was conducted by heating under reflux at 80° C. for 6 hours. The reaction solution thus obtained was cooled, and the precipitate was collected by filtration and recrystallized from water to obtain milky white crystals. Thus, 4,4'-disulfobutoxybiphenyl sodium was obtained.

(2) Preparation of 4,4'-dibutoxybiphenyl

In the same manner as in (1) above, 4,4'-dihydroxybiphenyl, 1-bromobutane and potassium carbonate were reacted in a proportion of 1:6:6 to prepare the objective compound. The reaction was conducted by heating under reflux at the refluxing temperature of acetone for 6 hours. The reaction solution thus obtained was cooled, potassium carbonate was filtered off, the filtrate was concentrated under reduced pressure and put into water, and the precipitate thus formed was collected by filtration and recrystallized from ethanol to obtain 4,4'-dibutoxybiphenyl.

(3) Preparation of Polyphenylene Copolymer

In the same manner as in Example 1 (4), 4,4'-disulfobutoxybiphenyl sodium and 4,4'-dibutoxybiphenyl. were compounded in a proportion of 20:80 and polymerized in nitrobenzene with anhydrous ferric chloride used as the oxidizing agent (according to the method described in Macromolecules, 1992, vol. 25, 5125). The reaction solution thus obtained was poured into methanol containing 5% hydrochloric acid, and the deposited precipitate was collected by filtration. Then the precipitate was repeatedly subjected to deionized water washing using a mixer and recovery operation by suction filtration until the filtrate became neutral, and then dried under reduced pressure at 120° C. for 10 hours to obtain a polymer. The polymer had an ion exchange group equivalent weight of 820 g/mol.

It was confirmed by $^1$H-NMR that a polyphenylene copolymer had been obtained which had just the same ratio of the repeating structural units represented by the formulas (I) and (III) of this invention of 20:80 as that of the fed materials. The polymer had a weight average molecular weight (determined by GPC and calculated in terms of polystyrene) of 22,000.

(4) Preparation of Electrolyte Membrane

The product obtained in (3) above was used to prepare an electrolyte membrane (VII) according to the same method as in Example 1 (5). The electrolyte membrane (VII) obtained had a thickness of 29 μm and an ionic conductivity of 0.022 s/cm.

FIG. 2 shows a relation between the ion exchange group equivalent weight of the electrolyte membrane (VII) prepared above and the ionic conductivity thereof.

The electrolyte membrane (VII) and 20 ml of deionized water were placed in an inner surface teflon-coated SUS closed vessel and held at 120° C. for 2 weeks. As the result, the ionic conductivity of the electrolyte membrane (VII) showed almost no change from the initial value, and the condition of the membrane was also normal.

(5) Preparation of Electrode Paste and Membrane/Electrode Assembly

The polymer obtained in (3) above was dissolved in a concentration of 5 weight % in a solvent mixture of isopropanol/water (80:20), and the resulting solution was added to a carbon carrying 40% by weight of platinum so that the weight ratio of the platinum catalysts to the polymer electrolyte might be 2:1. The resulting mixture was uniformly dispersed to prepare an electrode paste (VII). The electrode paste (VII) was coated on the both sides of the electrolyte membrane (VII) and dried to obtain a membrane/electrode assembly (VII) carrying 0.25 mg/cm$^2$ of platinum.

(6) Durability Test of Fuel Cell Single Cell

The membrane-electrode assembly (VII) was made to absorb water by immersing it in boiling deionized water for 2 hours. The membrane/electrode assembly thus obtained was built into an evaluation cell to evaluate the output performance of fuel cell. The result of evaluation is shown in FIG. 3. The polymer electrolyte fuel cell single cell was subjected to a long time operation test at a current density of 300 MA/cm$^2$. The result obtained is shown in FIG. 4.

Comparative Example 1

(1) Preparation of Polyphenylene Copolymer

In the same manner as in Example 1 (4), polymerization was conducted under the same conditions as described in Example 1 (4) except that 1,4-di(sulfobutoxy)benzene sodium, 1-methoxy-4-sulfobutoxybenzene sodium and 1,4-di(butoxy)benzene were compounded in a proportion of 20:30:50. The polymer obtained had an ion exchange group equivalent weight of 410 g/mol.

It was confirmed from $^1$H-NMR that a polyphenylene copolymer had been obtained which had just the same ratio of the repeating structural units represented by the formulas (I), (II) and (III) of this invention of 20:30:50 as that of the fed materials. The polymer had a weight average molecular weight (determined by GPC and calculated in terms of polystyrene) of 31,000.

(2) Preparation of Electrolyte Membrane

The product obtained in (1) above was used to prepare an electrolyte membrane (I') according to the same method as in Example 1 (5). The electrolyte membrane (I') obtained had a thickness of 30 μm and an ionic conductivity of 0.54 s/cm.

FIG. 2 shows a relation between the ion exchange group equivalent weight of the electrolyte membrane (I') prepared above and the ionic conductivity thereof.

The electrolyte membrane (I') and 20 ml of deionized water were placed in an inner surface teflon-coated SUS closed vessel and held at 120° C. for 2 weeks. Resultantly, the electrolyte membrane (I') heavily swelled and deformed.

Comparative Example 2

(1) Preparation of Polyphenylene Copolymer

In the same manner as in Example 1 (4), 1,4-di(sulfobutoxy)benzene sodium, 1-methoxy-4-sulfobutoxybenzene sodium and 1,4-di(butoxy)benzene were compounded in a proportion of 8:0:92, and polymerized. The polymer thus obtained had an ion exchange group equivalent weight of 2,660 g/mol.

It was confirmed from $^1$H-NMR that a copolymer had been obtained which had just the same ratio of the repeating structural units represented by the formulas (I), (II) and (III) of this invention of 8:0:92 as that of the fed materials. The polymer had a weight average molecular weight (determined by GPC and calculated in terms of polystyrene) of 30,000.

(2) Preparation of Electrode Membrane

The product obtained in (1) above was used to prepare an electrolyte membrane (II') according to the same method as in Example 1 (5). The electrolyte membrane (II') obtained had a thickness of 33 μm and an ionic conductivity of 0.004 s/cm.

FIG. 2 shows a relation between the ion exchange group equivalent weight of the electrolyte membrane (II') prepared above and the ionic conductivity thereof.

The electrolyte membrane (II') and 20 ml of deionized water were placed in an inner surface teflon-coated SUS closed vessel and held at 120° C. for 2 weeks. As the result, the ionic conductivity of the electrolyte membrane (II') showed no change from the initial value, and the condition of the membrane was also normal.

(3) Preparation of Electrode Paste and Membrane/Electrode Assembly

The polymer obtained in (1) above was dissolved in a solvent mixture of isopropanol/water (80:20) to a concentration of 5% by weight, and the resulting solution was added to a carbon carrying 405 by weight of platinum, and the mixture was dispersed uniformly to prepare an electrode paste (II').

The electrode paste (II') was coated on the both sides of the electrolyte membrane (II') obtained in (2) above, and then dried to prepare a membrane/electrode assembly carrying 0.25 mg/cm² of platinum.

(4) Durability Test of Fuel Cell Single Cell

The membrane/electrode assembly (II') was made to absorb water by immersing it in boiling deionized water for 2 hours. The resulting membrane/electrode assembly was built into an evaluation cell to evaluate the output performance of fuel cell. The result of evaluation is shown in FIG. 3. The above-mentioned polymer electrolyte fuel cell single cell was subjected to a long time operation test at a current density of 300 mA/cm². The result obtained is shown in FIG. 4.

Comparative Example 3

(1) Preparation of Polyphenylene Copolymer

In the same manner as in Example 1 (4), polymerization was conducted under the same conditions as described in Example 7 (3) except that 1,4-di(butoxy)benzene 1,4-di(sulfobutoxy)benzene, 1-methoxy-4-sulfobutoxybenzene and were compounded in a proportion of 30:20:50. Even when the polymer obtained was put into deionized water, no polymer deposited, the polymer being water-soluble.

Comparative Example 4

(1) Preparation of Electrolyte Membrane

A Nafion membrane was used as an electrolyte membrane to evaluate the output performance of fuel cell. The Nafion membrane was dipped in 5% aqueous hydrogen peroxide solution at 100° C. for 30 minutes, then in 55 dilute sulfuric acid at 100° C. for 30 minutes, and thereafter washed with deionized water at 100° C.

The above-mentioned electrolyte membrane and 20 ml of deionized after were placed in an inner surface teflon-coated SUS closed vessel and held at 120° C. for 2 weeks. As the result, the ionic conductivity of the electrolyte membrane showed no change from the initial value, but the membrane swelled and deformed.

(2) Preparation of Electrode Paste and Membrane/Electrode Assembly

Nafion was dissolved in a solvent mixture of isopropanol/water (80:20) to a concentration of 5% by weight. The resulting solution was added to a carbon carrying 40% by weight of platinum so that the weight ratio of the platinum catalyst to the polymer electrolyte might be 2:1, and the resulting mixture was dispersed uniformly to prepare an electrode paste (IV'). The electrode paste (IV') was coated on the both sides of the electrolyte membrane of the Nafion membrane obtained in (1) above, and dried to prepare a membrane/electrode assembly carrying 0.25 mg/cm² of platinum.

(3) Durability Test of Fuel Cell Single Cell

The membrane/electrode assembly (IV') was made to absorb water by immersing it in boiling deionized water for 2 hours. The membrane/electrode assembly thus obtained was built into an evaluation cell to evaluate the output performance of fuel cell. The result of evaluation is shown in FIG. 3. The above-mentioned polymer electrolyte fuel cell single cell was subjected to a long time operation test at a current density of 300 mA/cm². The result obtained is shown in FIG. 4.

It should be further understood by those skilled in the art that the foregoing description has been made on embodiments of the invention and that various changes and modifications may be made in the invention without departing from the spirit of the invention and the scope of the appended claims.

The aromatic hydrocarbon type ion exchange resin and the electrolyte using the resin according to this invention, as compared with previous perfluorohydrocarbonsulfonic acid type polymers, are easy to produce and inexpensive, and have sufficient acid resistance and high-temperature resistance for practical use. By using the electrolyte of this invention, there can be provided an electrolyte membrane, electrode coating solution, membrane/electrode assembly and fuel cell which have high performance characteristics and high reliability and are highly effective in reducing cost.

What is claimed is:

1. A process for producing an electrode assembly having an electrode catalyst formed therein which comprises a step of applying a coating of electrode paste for a fuel cell on a principal plane of a polymer electrolyte membrane of polyarylene type wherein sulfonic acid groups are bonded to aromatic rings via alkylene ether linkages, followed by drying, wherein:

the electrode paste comprises carbon particles carrying a metal catalyst dispersed in a solution for electrode catalyst coating, the solution comprises an ion exchange resin dissolved in a solvent, and said ion exchange resin comprises an arylene copolymer having at least two repeating structural units represented by the following formulas (I), (II) and (III):

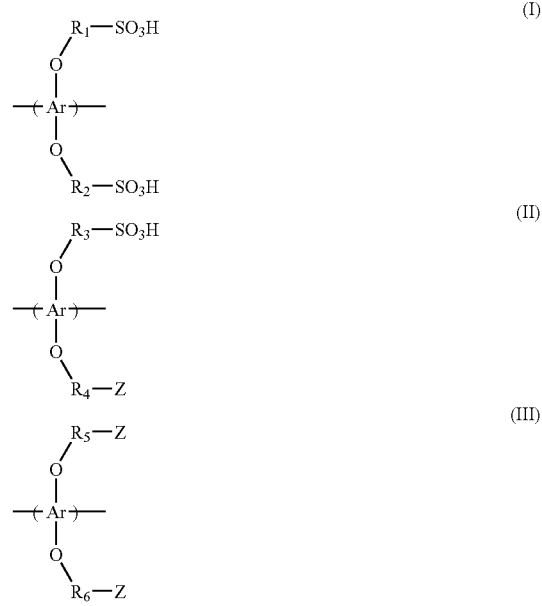

wherein Ar is at least one of the following linked structures represented by the following formulas (IV), (V) and (VI):

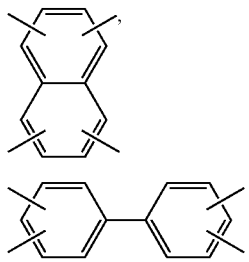 (V)

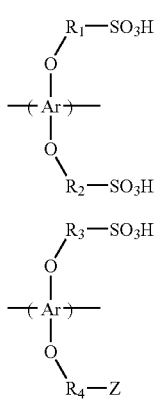 (VI)

$R_1$-$R_6$ are each a group independently selected from the group of alkyl groups having 1-6 carbon atoms, and Z is hydrogen or the methyl group.

2. The process according to claim 1 wherein the metal catalyst is platinum or its alloy.

3. A process for producing an electrode assembly having an electrode catalyst formed therein which comprises a step of applying a coating of electrode paste for a fuel cell on a gas diffusion seat having electronic conductivity, followed by drying, and a step of adhering the coated surface of the diffusion seat to both sides of a principal plane of a polymer electrolyte membrane of polyarylene type wherein sulfonic acid groups are bonded to aromatic rings via alkylene ether linkages, wherein:

the electrode paste comprises carbon particles carrying a metal catalyst dispersed in a solution for electrode catalyst coating, the solution comprises an ion exchange resin dissolved in a solvent, and said ion exchange resin comprises an arylene copolymer having at least two repeating structural units represented by the following formulas (I), (II) and (III):

 (I)

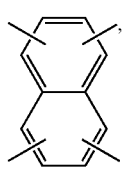 (II)

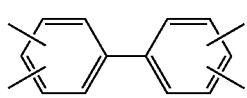 (III)

wherein Ar is at least one of the following linked structures represented by the following formulas (IV), (V) and (VI):

(IV)

(V)

(VI)

$R_1$-$R_6$ are each a group independently selected from the group of alkyl groups having 1-6 carbon atoms, and Z is hydrogen or the methyl group.

4. A fuel cell power generating apparatus comprising a reformer which reforms a fuel gas into an anode gas containing hydrogen, a fuel cell which generates electricity from the anode gas and a cathode gas containing oxygen, and a heat exchanger which exchanges heat between a high temperature anode gas which has come out from the reformer and a low temperature fuel gas supplied to the reformer, wherein the fuel cell comprises an electrode assembly having an electrode catalyst membrane formed therein, said catalyst membrane comprising a polymer electrolyte membrane held between an anode on one side of the principal plane of the electrolyte membrane and a cathode on the other side of the principal plane thereof, gas diffusion seats provided each independently, in close contact, to the anode side and the cathode side of the assembly, and electroconductive separators having gas supply passages to the anode and to the cathode provided on the outside surfaces of the gas diffusion seats, wherein the polymer electrolyte membrane comprises a polyarylene wherein sulfonic acid groups are bonded to aromatic rings via alkylene ether linkages.

5. The process according to claim 3, wherein the metal catalyst is platinum or its alloy.

* * * * *